(12) United States Patent
Pelle

(10) Patent No.: US 11,395,497 B2
(45) Date of Patent: Jul. 26, 2022

(54) DEVICE FOR BAKING DOUGH-BASED FOOD PRODUCTS, NET AND METHOD FOR BAKING SUCH PRODUCTS

(75) Inventor: Philippe Pelle, Chateau-Thierry (FR)

(73) Assignee: Revent International AB

( * ) Notice: Subject to any disclaimer, the term of this patent is extended or adjusted under 35 U.S.C. 154(b) by 191 days.

(21) Appl. No.: 13/582,158

(22) PCT Filed: Jan. 19, 2011

(86) PCT No.: PCT/EP2011/050679
§ 371 (c)(1),
(2), (4) Date: Aug. 31, 2012

(87) PCT Pub. No.: WO2011/107305
PCT Pub. Date: Sep. 9, 2011

(65) Prior Publication Data
US 2012/0321770 A1    Dec. 20, 2012

(30) Foreign Application Priority Data

Mar. 4, 2010 (FR) ...................................... 1051568

(51) Int. Cl.
*A21B 1/50* (2006.01)
*A21B 1/44* (2006.01)
(Continued)

(52) U.S. Cl.
CPC .................. *A21B 1/50* (2013.01); *A21B 1/44* (2013.01); *A21B 3/02* (2013.01); *A21B 3/155* (2013.01); *A21D 8/06* (2013.01)

(58) Field of Classification Search
CPC ...... F24C 15/00; F24C 15/162; F24C 15/164; A21D 8/06; A21D 8/08; A21B 3/02;
(Continued)

(56) References Cited

U.S. PATENT DOCUMENTS

| 489,827 A | 1/1893 | Newlin |
| 880,865 A | 3/1908 | Davis |

(Continued)

FOREIGN PATENT DOCUMENTS

| DE | 199 03 048 | 8/2000 | |
| DE | 20101501 U1 * | 4/2001 | ............... A21B 1/44 |

(Continued)

OTHER PUBLICATIONS

U.S. Appl. No. 14/427,123 Non-Final OA mailed Feb. 9, 2017, 19 pages.

(Continued)

*Primary Examiner* — Drew E Becker
*Assistant Examiner* — Austin Parker Taylor
(74) *Attorney, Agent, or Firm* — Adsero IP

(57) ABSTRACT

A device includes a carriage and an oven including a baking chamber, a plurality of stacked baking soles and elements for heating the soles. The device includes a plurality of nets made of a heat-resistant flexible material and at least one cell for receiving the food products. The carriage is arranged for inserting the nets into the oven, for withdrawing same and for positioning same opposite a sole. The device includes elements for vertically moving the soles and/or the nets relative to each other to place the soles and nets in an active position in which the bottom of the cells of a net is in contact with the baking sole located opposite and is capable of deformation upon contact with the sole so as to bake the products by induction, and in a passive position, in which the bottom of the cells is separated from the sole located opposite.

7 Claims, 3 Drawing Sheets

(51) Int. Cl.
    *A21B 3/15*     (2006.01)
    *A21B 3/02*     (2006.01)
    *A21D 8/06*     (2006.01)

(58) Field of Classification Search
    CPC ....... A21B 3/04; A21B 3/07; A21B 3/13–139;
                A21B 3/15; A21B 3/155; A21B 1/00;
                A21B 1/26; A21B 1/42; A21B 1/44;
                                      A21B 1/50
    USPC .......... 426/654, 391, 446, 496, 523; 99/448,
                                                      99/329 P
    See application file for complete search history.

(56) References Cited

U.S. PATENT DOCUMENTS

| | | | |
|---|---|---|---|
| 1,485,173 A | | 2/1924 | Eaton et al. |
| 1,535,579 A | | 4/1925 | Colby |
| 1,543,692 A | | 6/1925 | Biebel |
| 1,786,142 A | | 12/1930 | Wyman |
| 2,099,883 A | | 9/1937 | Graham |
| 2,098,729 A | | 11/1937 | Myers et al. |
| 2,431,753 A | | 12/1947 | Holderle et al. |
| 2,525,201 A | * | 10/1950 | Beynon ................. F24C 15/162 |
| | | | 126/340 |
| 2,578,520 A | | 12/1951 | Roger |
| 2,724,764 A | * | 11/1955 | Ritchie .................... A21B 1/44 |
| | | | 312/351 |
| 3,276,166 A | | 10/1966 | Markus |
| 3,425,364 A | | 2/1969 | Martin, Jr. |
| 3,537,405 A | * | 11/1970 | Verhoeven ............... A21B 1/50 |
| | | | 426/523 |
| 3,611,637 A | | 10/1971 | Saino |
| 3,641,945 A | | 2/1972 | Tillander |
| 3,827,182 A | | 8/1974 | Van Helleputte |
| 3,954,053 A | * | 5/1976 | Johansson ................. A21B 1/44 |
| | | | 99/443 R |
| 4,351,392 A | | 9/1982 | Stockman |
| 4,413,173 A | * | 11/1983 | Grove .................. A47J 37/0635 |
| | | | 219/412 |
| 4,503,837 A | | 3/1985 | Smith |
| 4,552,123 A | | 11/1985 | Birkner et al. |
| 4,643,163 A | | 2/1987 | Martinez |
| 4,757,184 A | * | 7/1988 | Swanson et al. ............. 219/400 |
| 4,785,151 A | | 11/1988 | Voegtlin |
| 4,790,241 A | * | 12/1988 | Lugo ........................ A21B 3/07 |
| | | | 99/352 |
| 4,815,535 A | | 3/1989 | Hagemeister |
| 4,892,083 A | | 1/1990 | Konig |
| 5,058,266 A | | 10/1991 | Knoll |
| 5,107,821 A | | 4/1992 | von Blanquet |
| 5,129,384 A | | 7/1992 | Parks |
| 5,185,925 A | | 2/1993 | Ryan et al. |
| 5,394,791 A | | 3/1995 | Vallee |
| 5,398,666 A | | 3/1995 | Smith |
| 5,431,093 A | | 7/1995 | Dodgen |
| 5,461,829 A | | 10/1995 | Lehto et al. |
| 5,476,141 A | | 12/1995 | Tanaka |
| 5,653,164 A | | 8/1997 | Vallee |
| 5,704,423 A | | 1/1998 | Letrange |
| 5,845,563 A | | 12/1998 | Haring |
| 5,857,290 A | | 1/1999 | Schnarr |
| 6,000,467 A | | 12/1999 | Tokizaki et al. |
| 6,044,833 A | | 4/2000 | Gebhardt et al. |
| 6,101,930 A | * | 8/2000 | Van Over ................ F24C 15/16 |
| | | | 126/12 |
| 6,167,800 B1 | | 1/2001 | Su |
| 6,363,836 B1 | | 4/2002 | Usherovich |
| 6,815,644 B1 | | 11/2004 | Muegge et al. |
| 6,988,539 B2 | | 1/2006 | Kato et al. |
| 6,998,582 B1 | | 2/2006 | Maroti |
| 7,165,606 B2 | | 1/2007 | Take |
| 7,367,159 B2 | | 5/2008 | Delgado et al. |
| 7,604,002 B2 | * | 10/2009 | Rabas ..................... F24C 15/16 |
| | | | 126/332 |
| 9,574,778 B2 | | 2/2017 | Woods |
| 9,961,906 B2 | | 5/2018 | Engstrom et al. |
| 10,258,049 B2 | | 4/2019 | Engstrom |
| 2002/0007941 A1 | | 1/2002 | Zhu et al. |
| 2002/0066554 A1 | | 6/2002 | Oh et al. |
| 2002/0108502 A1 | | 8/2002 | Kim |
| 2004/0099149 A1 | * | 5/2004 | Morgan ................... A21B 3/13 |
| | | | 99/426 |
| 2004/0144260 A1 | | 7/2004 | Backus |
| 2005/0051149 A1 | * | 3/2005 | Bock ........................ A21B 1/44 |
| | | | 126/19 R |
| 2005/0145623 A1 | * | 7/2005 | Pool ........................ F24C 15/16 |
| | | | 219/730 |
| 2006/0225580 A1 | | 10/2006 | Fernandez |
| 2006/0289530 A1 | | 12/2006 | Cordae |
| 2008/0146200 A1 | * | 6/2008 | Martin .................. H04M 3/436 |
| | | | 455/413 |
| 2008/0156201 A1 | | 7/2008 | Cook |
| 2009/0145031 A1 | | 6/2009 | Collene |
| 2009/0294441 A1 | | 12/2009 | Wen et al. |
| 2011/0094258 A1 | | 4/2011 | Lee et al. |
| 2013/0174831 A1 | | 7/2013 | Shaffer |
| 2013/0239944 A1 | | 9/2013 | Woods |
| 2014/0224133 A1 | | 8/2014 | Willett |
| 2015/0068244 A1 | | 3/2015 | Lee et al. |
| 2015/0245622 A1 | | 9/2015 | Engstrom et al. |
| 2016/0245532 A1 | | 8/2016 | Eliasson |
| 2019/0357545 A1 | | 11/2019 | Pelle |

FOREIGN PATENT DOCUMENTS

| | | | | |
|---|---|---|---|---|
| DE | 19903048 C2 | * | 4/2002 | ............... A21B 3/07 |
| EP | 0848213 A1 | | 6/1998 | |
| EP | 2384626 A1 | | 11/2011 | |
| FR | 2 480 081 | | 10/1981 | |
| FR | 2553626 | | 4/1985 | |
| FR | 2559030 A1 | | 8/1985 | |
| FR | 2559030 A1 | * | 8/1985 | ............... A21B 3/15 |
| FR | 2699219 A1 | | 6/1994 | |
| GB | 855029 A | | 11/1960 | |
| JP | S56-058006 | | 5/1981 | |
| JP | S62-186733 | | 8/1987 | |
| JP | 02084254 | | 3/1990 | |
| JP | 06300473 | | 10/1994 | |
| JP | 2002-181468 | | 6/2002 | |
| JP | 2005-351567 | | 12/2005 | |
| JP | 8131052 A | | 5/2008 | |

OTHER PUBLICATIONS

U.S. Appl. No. 14/427,123 Final OA mailed Jul. 3, 2017, 22 pages.
U.S. Appl. No. 14/427,123 Notice of Allowance dated Feb. 8, 2018, 18 pages.
JP 2015-531044 Office Action dated May 9, 2017.
International Search Report, dated Jan. 2, 2014, from corresponding PCT application.
U.S. Appl. No. 16/533,529 U.S. Application, filed Aug. 6, 2019, 44 pages.
U.S. Appl. No. 14/427,137 Non-Final Office Action dated Jan. 25, 2018, 56 pages.
U.S. Appl. No. 14/427,137 Final Office Action dated Jun. 2, 2018, 13 pages.
U.S. Appl. No. 16/533,529 Non-Final Office Action dated Jun. 26, 2020, 12 pages.
Japanese Office Action, dated Dec. 1, 2014, from corresponding JP application.
International Search Report dated Apr. 21, 2011, corresponding to PCT/EP2011/050679.
U.S. Appl. No. 16/533,529 Non-Final Office Action dated May 11, 2022, 94 pages.

* cited by examiner

DEVICE FOR BAKING DOUGH-BASED FOOD PRODUCTS, NET AND METHOD FOR BAKING SUCH PRODUCTS

BACKGROUND OF THE INVENTION

This invention relates to a device for the baking of foods, namely dough-based foods such as dough pieces.

Its specific application is for bakery, pastries, biscuits or catering, where a certain number of products are manufactured from dough.

For purposes of simplification, the invention shall only be described with reference to the baking of dough pieces, such as those used for the manufacture of bread loaves and baguettes in the bakery sector.

The invention also concerns a baking net for such a cooking device, as well as a method for the baking of dough pieces.

In the bakery sector, there are two main types of oven, which are the "soles" oven and the "convection" oven, while the latter has two variants, with a "fixed" carriage and one with a "rotating" carriage.

An oven with soles comprises one or more baking chambers, which may or may not be separated, inside of which there are one or more soles, these being superimposed forming a column with several cooking levels, and may even have several columns placed side by side.

Each sole consists of a hearth made of heat-resistant material.

The oven has several means of heating the air in the oven, such as electric resistance or a burner, and to circulate the air inside the chamber in order to raise the temperature of the soles. Sometimes a heated fluid (air, water, oil or other) passes directly inside the sole.

In this type of oven, the dough pieces are placed on the surface of the hot sole and the bread is baked by way of conduction, that is by direct transfer of the heat stored by the sole to the bread.

The quality of this baking method is optimal and produces a bread loaf the underside of which consumers can identify as resulting from artisan baking.

This type of product is therefore highly prized and can be sold at a relatively high price.

However, in this type of oven, the dough pieces are placed on soles, either individually using a shovel, or collectively using an oven loader, which the baker uses to insert a batch of dough pieces on a given oven sole. The baker must then repeat this operation for each baking level (on each sole).

Also, he must first handle each dough piece to take it off a so-called "proofing" carriage, on which this dough piece proofs, in order to place it on the oven loader.

Consequently, this type of oven requires a lot of handling, a lot of labour and therefore presents low productivity levels. However, consumer demand for bread baked in sole ovens is constantly increasing.

Convection ovens generally exist in the form of a cabinet inside which there is a cooking chamber, means of heating and of air propulsion allowing the hot air to be circulated in the said chamber.

This oven works with a carriage that can be inserted inside of the said cooking chamber.

This carriage carries several platters, called "nets", which are superimposed and placed on lateral guide rails along which they can slide. Each net has a series of rigid parallel cells inside each of which the baker can place a dough piece. When the nets are full of dough pieces, they are placed on the carriage, and when the carriage is full, it is inserted into the baking chamber of the convection oven in a single operation.

Inside of such an oven, the bread is baked by convection, that is by the transfer of heat from the air that circulates inside the baking chamber to the bread. As previously specified, the carriage can be fixed or rotating.

This type of oven allows for quick and simultaneous handling of a large number of dough pieces. The carriage can be inserted into the oven by persons with little technical training, labour is reduced to a minimum and productivity levels are high. This technique therefore saves time and energy.

However, the nets on which the dough pieces are placed mark the underside of the bread which then has a grid appearance. The consumer then associates the bread obtained with a product resulting from industrial manufacturing.

Therefore, there is less consumer demand for bread obtained in this type of oven and the bread can only be sold in places where the bread can be of average quality, such as in hypermarkets and supermarkets.

Bakers would naturally like to be able to sell bread that is identified by the consumer as a product resulting from artisan baking methods while retaining the productivity levels resulting from the use of a convection oven.

Several technical solutions have been considered to attempt to meet this objective.

Thus, there are so-called "multi-loading" systems that combine the use of a classic sole oven with a carriage comprising several superimposed loading belts. This carriage allows the baker to successively load a batch of dough pieces on the sole of each baking floor.

However, such a multi-loading carriage is very heavy and therefore difficult to handle. It must also be rigorously aligned with the oven soles. Finally, it generally comprises only eight to ten loading belts for technical reasons and in order to limit its weight. This consequently also limits the number of oven soles to eight or ten.

The proofing carriages used prior to baking have between sixteen and twenty levels. There is therefore an inconsistency between the number of proofing carriage levels and the number of multi-loader loading belts and/or the number of oven soles. This then forces the baker to use specific proofing carriages which correspond to the number of soles but which do not fully use the capacity of the proofing chambers.

The number of proofing carriages and chambers must therefore be increased, which also increases space utilisation and cost.

Also, this creates cumbersome pre-baking procedures, and requires several proofing carriages and carriages for the transfer of dough pieces, from which the baker takes the dough pieces and places them on the multi-loading carriage. The overall burden of all this equipment is significant.

There is also an apparatus which combines the use of a sole oven with a carriage comprising several nets for dough pieces. The carriage is inserted inside the oven in such a way that the nets are located close to the soles.

Such a solution presents the advantages of a convection oven in terms of productivity, but the baking process is carried out using radiation heat and the underside of the bread keeps its "grilled" appearance associated with industrial baking, which has a negative image to consumers.

Finally, there is also document DE 199 03 048, an oven comprising one baking chamber equipped with several heated soles and a baking carriage which carries several rigid pastry sheets. This oven also has a raising apparatus which allows the said carriage to be raised or lowered in order to put the pastry sheets in contact with the heated soles or to move them away from them.

The position of the baking carriage can therefore be modified during baking. According to a preferred variant of application described in this document, the pastry sheets are first brought into contact with the soles for high heat transfer, then they are moved away for the rest of the baking process.

Such an oven presents many disadvantages. The flat and rigid pastry sheets can be heavy and present high thermal inertia if made from stainless steel. They can be lighter if made from aluminium sheets, but this results in low quality heat transfer.

The cooking of the product obtained is therefore difficult to regulate.

Moreover, if the dough piece must be proofed prior to baking, such pastry sheets cannot be used since they store the dough pieces on a flat surface which means they do not retain their round shape.

Finally, the humidity between the product to be baked and the pastry sheet is not well evacuated. If significant levels of humidity are accumulated, such as during proofing prior to baking, the steam that is not evacuated marks the bottom of the baked product (small bubbles) which means that the baked product has a visual appearance disliked by consumers.

BRIEF SUMMARY OF THE INVENTION

The purpose of the invention is therefore to remedy these disadvantages of the state of the art and namely to offer a cooking device allowing the visual and taste qualities of sole-baked products to be combined with the easy handling, productivity and profitability of the baking process using a convection oven as described above.

To this end, the invention relates to a device for the baking of dough-based food products, namely dough pieces, comprising:

An oven and a carriage,

The oven comprising one baking chamber, one cooking module which itself comprises several baking soles made from material with good thermal conductivity, stacked and spaced apart, and means of heating the said soles, such cooking module being located in the interior of the said baking chamber.

According to the invention, this cooking device:

Comprises several nets, each one comprising a strip of flexible material fixed onto a frame, such flexible material, which is capable of deformation, being heat-resistant and comprising at least one cell for the said food products to be cooked, The said carriage carries the said nets placed in a superimposed manner spaced apart from each other, and is arranged in order to allow the said nets to be inserted into the oven and withdrawn from it and comprises means of positioning each net on and above a cooking sole, In addition, it also comprises the means to move the soles of the said cooking module and/or the nets vertically in relation to each other, these vertical movement mechanisms allowing the said soles and the said nets to be brought into a so-called "active" position, whereby the bottom of the cells of a net touches the baking sole above which it is located and deforms upon contact with this baking sole so that the said food products are baked by conduction, and into a so-called "passive" position, whereby the bottom of the said cells is placed away from the sole above which they are placed so that the said nets can be inserted into or withdrawn from the said oven.

According to the other beneficial and non-restrictive characteristics of the invention, taken alone or in combination:

The said vertical movement mechanisms for the soles and/or nets are housed in the oven;

The said vertical displacement mechanisms are mechanisms for the displacement of the cooking module which allow it to be raised bringing it into the active position and lowered bringing it into the passive position;

The said vertical movement mechanisms for the nets are located on the carriage and consist of a support chassis for the said nets, which can be moved in a linear direction in relation to the carriage structure;

The cooking device comprises mechanisms for the simultaneous rotation of the nets and the cooking module;

The mechanisms for the simultaneous rotation of the nets and the cooking module also constitute the vertical movement mechanisms of the soles of the said cooking module and/or the nets in relation to each other;

The said means of heating the soles comprise an air propulsion turbine and a heat source such as a burner or electric resistance;

The cooking device comprises a control apparatus for the vertical displacement mechanisms of the said soles and/or the said nets in relation to each other and/or the mechanisms for the simultaneous rotation of the nets and the cooking module in accordance with the position of the oven door so that the nets and soles are placed in the active position when the oven door is closed and in the passive position when the oven door is open;

Said carriage comprises a chassis with pairs of slides and the frame of each net is sized and arranged to be slideable along said rails and be supported by them;

The flexible material of which said nets are made is water and/or steam permeable, such as a web or lattice;

Said nets are made of woven fibreglass;

Said nets are coated with a non-stick material.

The invention also concerns a net for cooking dough-based food products, namely dough pieces, for a cooking device as cited above. This net comprises: a support frame and a strip of flexible material, such as a web or trellis, attached to this frame and shaped in such a way as to define at least one cell for the said food-products, this flexible material being made from woven fibreglass, and optionally coated with a non-stick material.

Finally, the invention also relates to a method for cooking dough pieces. It comprises the steps of:

Placing the said dough pieces inside the cells of a net made from a flexible material, such as a web or lattice, fixed onto a frame, this flexible material being heat-resistant, Inserting this net into an oven equipped with at least one baking sole and means of heating the said soles, Vertically moving the said sole and/or net in relation to each other, so as to bring the said sole and said net into a so-called "active" position, whereby the bottom of the cells of the net touches the baking sole above which it is located and deforms upon contact with this cooking sole so that the said food products are cooked by conduction, Vertically moving the said sole and/or net in relation to each other, so as to bring them into a so-called "passive" position, whereby the bottom of said cells is removed from the sole above which they are placed so that said net can be extracted from said oven.

Other characteristics and advantages of the invention will be shown by the description to follow, with reference to attached drawings, which show some but not all of several possible methods of application.

BRIEF DESCRIPTION OF THE SEVERAL VIEWS OF THE DRAWING(S)

DETAILED DESCRIPTION OF THE INVENTION

Figure 1:
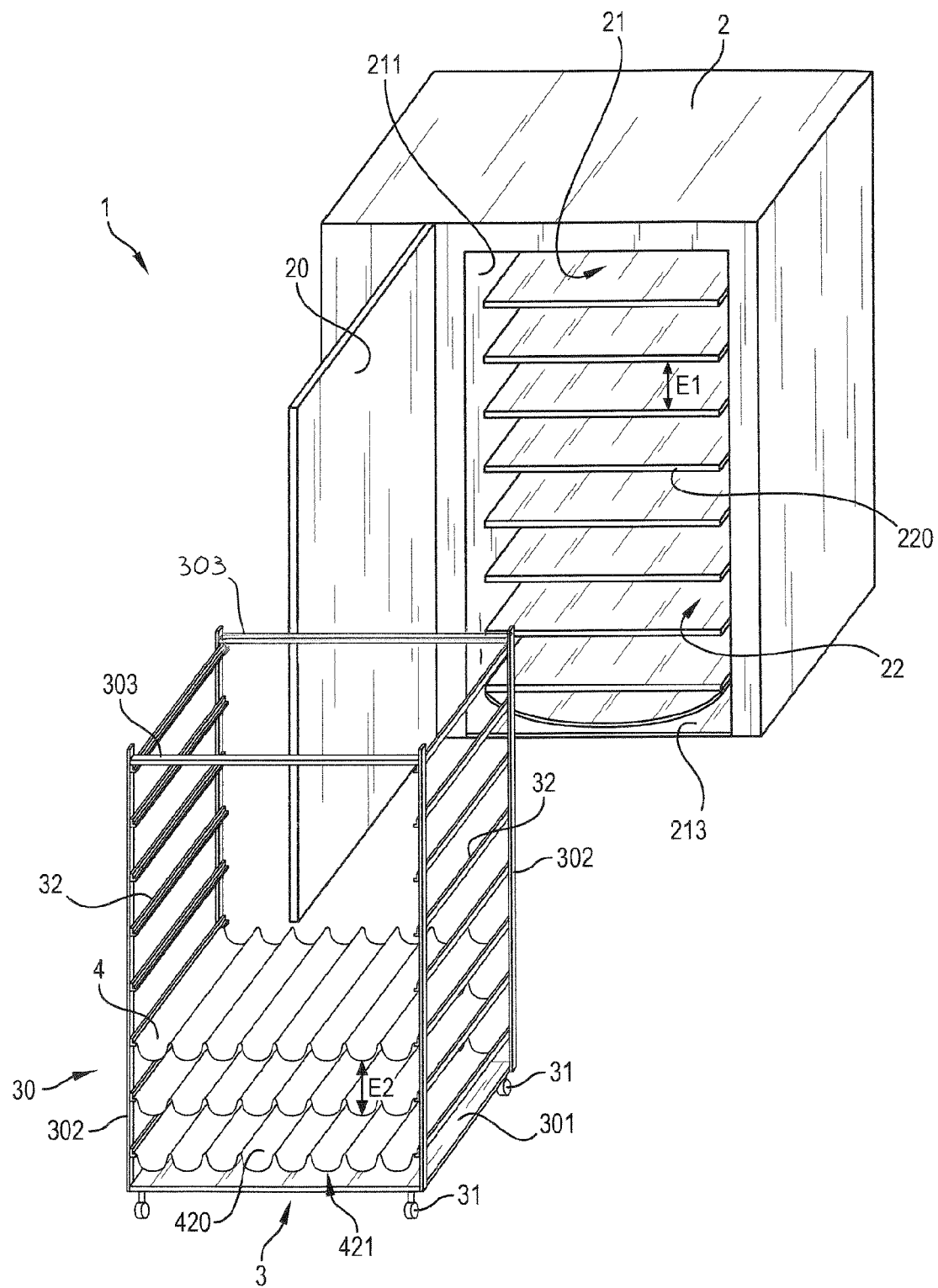
FIG. 1 is a perspective view of a method of application of the cooking device in accordance with the invention which combines an oven and a carriage.

As can be seen from FIG. 1, the cooking device 1 according to the invention comprises an oven 2 and a carriage 3.

The oven 2 is a cabinet type oven, which has a door 20 allowing access to a baking chamber 21 inside the said cabinet.

The baking chamber 21 is bounded by vertical walls 211 inside the cabinet, a ceiling 212 and a bottom 213, (also see FIGS. 3A to 5B).

A cooking module 22 is located inside the baking chamber 21.

The cooking module 22 comprises several superimposed soles 220, spaced apart from each other at a specific interval E1. Each sole consists of a hearth made from a material with good thermal conductivity, such as a refractory, aluminium, ceramic, cast iron or other material.

The number of these soles 220 is variable. In order to simplify the drawings, the number of soles represented is eight in FIG. 1 and seven in FIGS. 3A to 5B. However, the number of these soles is generally comprised between sixteen and twenty depending on the size of the products to be baked.

As will be described in more detail below, the cooking module 22 may be fixed or mobile.

When this cooking module 22 is fixed, the soles 220 may be fixed laterally directly onto the vertical walls 211 of the baking chamber. They may also be fixed onto a metallic chassis 221, itself attached to the oven walls, (see for example FIGS. 4A and 4B).

The soles 220 may be permanently fixed to the oven walls or to the chassis 221 or otherwise be detachable. In the latter case, they could stand on angles, themselves attached to the oven walls or the chassis.

The soles 220 may also be installed or fixed on a carriage, the latter being housed in the baking chamber 21 and can be extracted from it, such as upon cleaning of the oven.

Preferably, and for reasons to be explained below, the soles 220 are only fixed on the rear vertical wall of the oven, either directly or by way of a chassis.

The oven 2 also comprises means 23 of heating the soles 220.

The means of heating 23 may consist of electric resistance or a heat medium which winds in the thickness of each sole 220 in order to heat it. In this case, the soles 220 are fixed.

However, preferably, these heating mechanisms 23 consist of a burner or electric resistance associated with a turbine which allows the hot air or other fluid, which has previously been heated by such burner or this resistance, inside the baking chamber 21.

These mechanisms 23 are illustrated in FIGS. 3A to 5B are can only be seen on these figures.

Upon contact with the hot air, the material of the soles 220 will store the heat.

This principle of heating the soles is known as "convection" heating.

The cooking module 22 may either be rotationally fixed or rotationally driven (see arrows F on FIG. 5B), the hot air being blown by the turbine and circulating inside the baking chamber 21.

The cooking module 22 permanently remains inside the baking chamber 21 for the soles 220 to remain hot once they have reached the necessary temperature to cook the food products. It must, however, be noted that it can be detachable for maintenance operations or to return the oven to a standard version if the convection mode is required.

FIG. 1 shows a mode of implementation for the carriage 3. This comprises a referenced chassis 30, for example, which could be assembled on four wheels 31 which enable the carriage to be moved.

The chassis 30 consists of a square or rectangular base 301 at the angles of which four vertical uprights 302 are fixed or welded, which themselves are joined together in pairs on their upper extremity by a crossbar 303 to rigidify the structure.

The crossbars and uprights are, for example, made of metallic tubes.

The base 301 may be solid, as shown in FIG. 1, or be made of an assembly of four tubes assembled or welded at their ends so as to form a frame.

Sliders 32, which could be made of metallic L-shaped angles, are fixed to the vertical uprights 302 on their ends. Such sliders 32 are arranged in pairs, (one of each pair attached to uprights 302), so as to receive the two lateral ends of a net 4 which shall be described below and to maintain the later horizontal or significantly horizontal.

The nets 4 can thus be loaded on carriage 3 by sliding between the two sliders 32 of a given pair.

In order not to unnecessarily overload the drawings, carriage 3 has been shown as only being able to hold eight stacked nets 4. However, such a carriage normally comprises between sixteen and twenty pairs of rails 32 in order to hold the same number of nets 4.

As an advantage, the number of nets 4 and soles 220 is identical.

According to another variant of application not shown in the drawings, the carriage 3 can be made in two parts, one of which to hold the nets 4 and another part bearing the wheels 31 or other means of moving the carriage, these two parts being separable from one another.

According to a another variant of application not shown in the drawings, the carriage 3 comprises gripper arms which allows all of the nets 4 to be handled and placed inside of the oven 2 or to withdraw them from it. The carriage 3 is then removed from the oven during the cooking process itself.

The use of these different ovens will be described below.

One of the nets 4 will be described in more detail in reference to FIG. 2.

The term "net" 4 designates a platter comprising a frame 41 forming a support frame for a strip of flexible material 42, such as a web or trellis. The frame 41 is preferably made of metal or any other material resistant to the temperatures reached the oven.

The frame 41 could be made of several solid metallic wire, such as stainless steel, preferably welded to each other.

Figure 2:
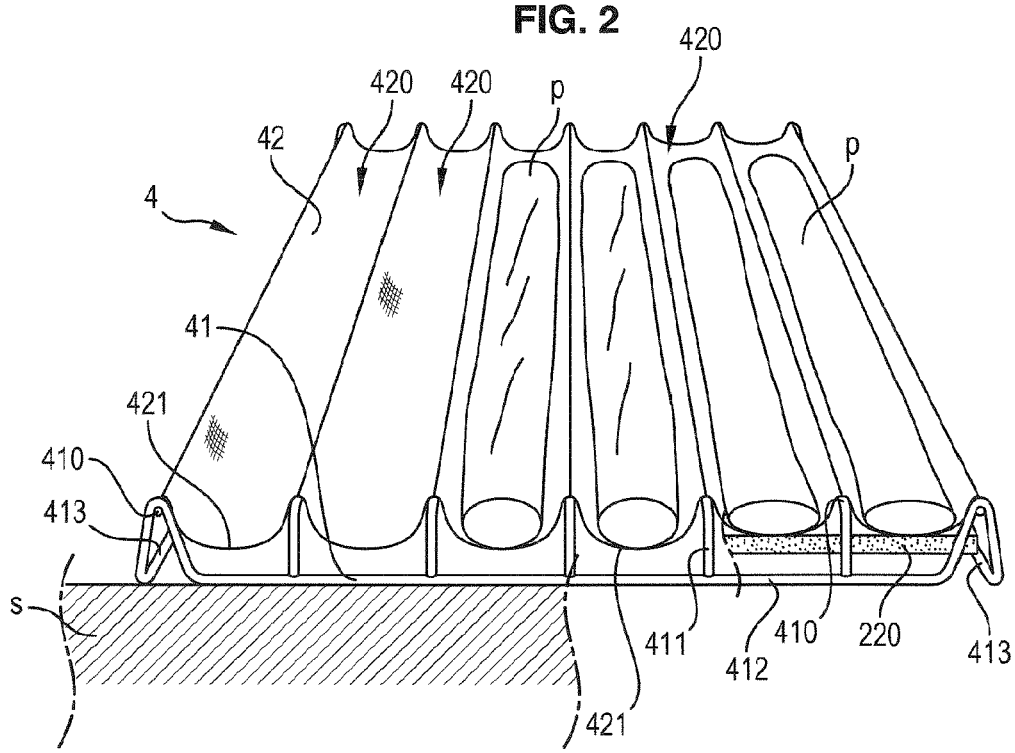
FIG. 2 is a perspective view of a net according to the invention.

The frame 41 consists of several rectilinear wires 410, of which there are seven in FIG. 2, placed horizontally in parallel to each other. The five wires 410 in the middle are also curved vertically both ends 411. An additional wire 412 is curved inwards several times so as to form a square or rectangular frame onto which the ends of the wires 410 are welded.

Both rectilinear lateral portions of the wire 412 are guides 413. They are placed on the sliders 32 when the net 4 is engaged on the carriage 3.

The strip of flexible material 42 is placed and fixed on the frame 41 so as to form a series of parallel cells 420, here in the form of chutes.

Each chute 420 extends between two neighbouring wires 410. In FIG. 2, six chutes formed between the seven wires 410 can be seen.

The length of the strip of flexible material 42 and therefore the length of the chutes 420 is adapted in order to be able to hold for example one dough piece p or two placed end-to-end, or even more.

The number of cells 420 is dependent on the dimensions of the product and the cooking capacity required for the oven. There is at least one well per net 4.

The strip of flexible material 42 must be sufficiently flexible in order to be reversed and take the shape of the dough piece p when this is placed inside a cell 420 (see central part of FIG. 2) or to deform and come in contact with the sole 220 as described below, (see right hand side of FIG. 2).

The bottom of the cells 420 is referenced as 421.

The flexible material 42 must also be resistant to the heat levels in the oven. It has the advantage of being water and/or steam permeable.

In accordance with a first variant of application, the flexible material 42 is a web made of wires of a heat-resistant material, such as stainless steel, or another material, according to the aesthetic aspect required for the product to be cooked. These wires are woven into a web or trellis. The diameter of each wire is preferably between 20 µm and 100 µm. The ratio between the open areas and the solid areas of the net (percentage of open areas) should preferably be lower than 60%, and more preferably comprised between 20% and 60% in order to prevent the dough from falling through the netting when it is not yet cooked. The existence of passages between the netting of the net makes this material water and/or steam permeable.

Preferably, the wire used for the trellis is bare, which means that it does not have a silicone or fluoropolymer-type non-stick coating, such as those used in nets known from prior art. This is healthier for the consumer of the baked product obtained. However, it could also be coated with such a non-stick coating.

In accordance with another variant of application, the flexible material 42 is a fabric formed of woven fibreglass (called "woven fibreglass"). Preferably, it is coated with a non-stick material, such as polytetrafluoroethylene (PTFE) or silicone. Preferably, its thickness should be lower than 0.3 mm, and more preferably less than 0.15 mm, and most preferably around 0.1 mm. Such fabric is sold by the company TACONIC Corporate, for example.

The openings between the fibres or the wires guarantee water and steam permeability. These openings are, however, sufficiently small so that the dough from the dough pieces (even highly hydrated) does not pass through them when it is not yet cooked.

The sliders 32 of the carriage 3 are positioned in such a way that two adjacently stacked nets 4 are set apart from each other by a space E2.

On FIG. 1, only three nets 4 have been shown.

The dimensions of carriage 3, nets 4 and their spacing E2, as well as the dimensions of the soles 220 and their spacing E1 and the width of the soles 220 and of the nets 4 are adapted so as to allow the insertion of the carriage 3 inside of the baking chamber 21, each sole 220 being placed under a net 4.

This specific arrangement is better shown in FIGS. 3A to 5B.

For the oven version with soles 220 fixed to the lateral walls 211 of the oven, it must be noted that in order to obtain this fitting of the carriage 3 between the stacked soles 220, the carriage does not have vertical uprights 302 in its front part. The sliders 32 are cantilevered.

For the version of the oven where the soles 220 are fixed on the rear wall of the oven or on a rear chassis, the carriage 30 can have four vertical uprights 302. In this case, the soles 220 or the entire cooking module 22 have a lesser width than that of the carriage 3, which allows it to be inserted into the oven.

According to the invention, the oven 2 also comprises vertical displacement mechanisms for the soles 220 in relation to the nets 4.

Different methods of application of these mechanisms will now be described in connection with the diagrams in FIGS. 3A to 5B.

These vertical displacement mechanisms allow the soles 220 of the cooking module 22 and the nets 4 to be brought either into a so-called "active" position, whereby the bottom 421 of the cells of the nets 4 touches a baking sole 220, or into a so-called "passive" position, whereby the bottom 421 of the cells 420 is placed away from the sole 220 above which they are placed.

"Vertical displacement mechanisms" means any mechanism which allows the soles or the nets to be brought into a higher or lower position than their original position at the time when the carriage is loaded into the oven.

On FIG. 2, four different situations occupied by the cells 420 are shown as a diagram.

In the left hand side of FIG. 2, the situation of two empty cells 420 has been shown where the net 4 is placed on a flat surface s, such as a work surface. The flexible material 42 is fixed on frame 41 so that the bottom 421 of the cells does not touch or is hardly flush with the surface s.

In the middle left part of FIG. 2, the situation where a dough piece p has been placed in a cell while the net 4 is on the flat surface s is depicted. The flexible material 42 takes the shape of the dough piece p but does not touch or is not flush with the support s. In the middle right part of FIG. 2, the situation where a dough piece p has been placed in a cell while the net 4 is on the carriage 3 is depicted. These two situations may correspond to the time when the dough piece p is proofing. Thanks to this deformability of the material 42, the dough piece is maintained laterally and can keep its slightly circular section during this phase.

Finally, in the right part of FIG. 2, the situation where two dough pieces p have been placed in cells 420 and where the net 4 and a sole 220 are in the above-mentioned active position is depicted. In this case, the flexible material 42 of the net is deformed (namely the bottom 421 of the cell 420) and is flattened upon contact with the sole 220 and allows the dough pieces p placed in the cells 420 to be cooked by conduction.

The deformation of the flexible material 42 being reversible, the cell 420 will regain its original shape (see left part of FIG. 2) once the net is removed from the sole.

A first method of application of the vertical movement mechanisms will now be described in connection with FIGS. 3A and 3B. In this case, these mechanisms 5 allow the cooking module 22 to be moved vertically in relation to the carriage 3 and the soles 220.

The rear edges of the soles 220 of the cooking module 22 are fixed on a mobile chassis 222, which could be made of assembled metallic tubes.

The upper part of the mobile chassis 222 is protracted with a vertical axis 223, the upper end of which is connected to mechanical and/or motor mechanisms 5. The latter allow the axis 223 and at the same time the chassis 222 and all the soles 220 to be moved vertically.

According to another possible variant, the chassis 222 slides along guide rails attached to the oven walls by means of the mechanical and/or motor mechanisms 5.

These mechanisms 5 could be an electrical motor and/or purely mechanical elements, such as manual levers or rods or cams.

As an advantage, a control mechanism may be provided for to control the vertical movement mechanisms 5 upon opening or closing of the door 20 by the operator.

This mechanism could be comprised of a sensor 6 which detects the position of the door 20 and which is connected to the said motor/mechanical mechanisms 5 in order to activate or deactivate them.

The cooking mechanism functions as follows.

Once the dough pieces have been placed in the cells 420 of the net 4 and these nets have been loaded onto the carriage 3, the baker can open the door 20 and insert the carriage 3 into the baking chamber 21 by sliding this carriage on the bottom 213 of the oven 2.

The soles 220 will have been pre-heated.

Figure 3A:
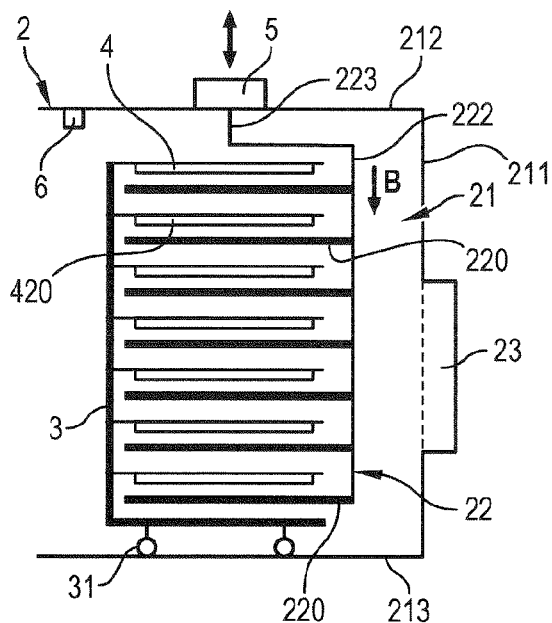
FIGS. 3A and 3B are diagrams showing the operating principle of a first method of application of said cooking device, FIGS. 4A and 4B and FIGS. 5A and 5B respectively are similar diagrams for a second and third method of application of the invention.
Figure 3B:
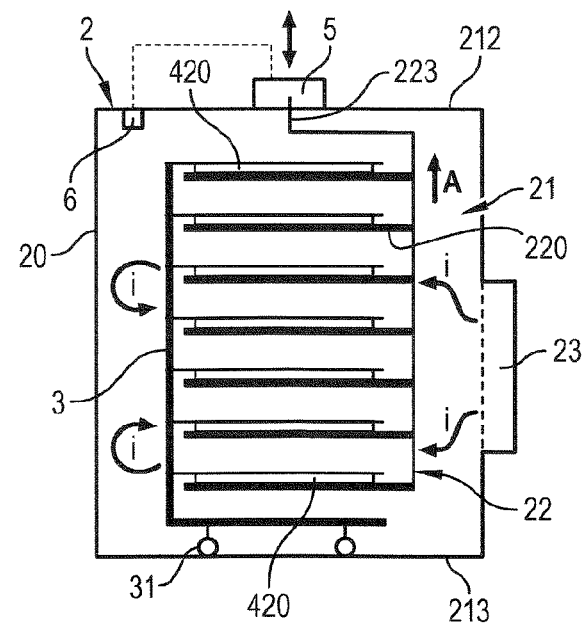

The baker closes the door 20 and the motor/mechanical mechanisms 5 are activated to move the cooking module 22 upwards as shown by arrow A on FIG. 3B. Thus, it is in the active position.

When the baking by conduction is complete, the baker opens the door 20, and the motor mechanisms 5 are activated in the opposite direction to cause the module 22 to descend (see arrow B in FIG. 3A).

In this passive position, the soles 220 are away from the bottom 421 of the cells and the baker can remove the carriage 3 from the oven 2.

Two other methods of application will now be described in connection with FIGS. 4A and 4B on the one hand, and 5A and 5B on the other.

The identical elements bear the same numeric references.

Figure 4A:
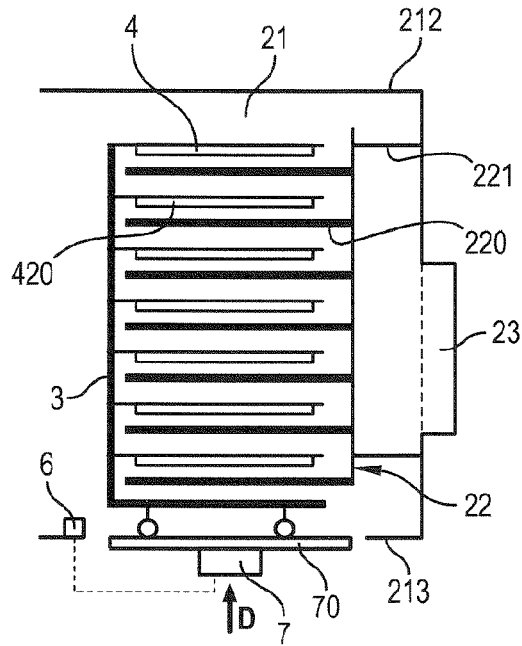
Figure 4B:
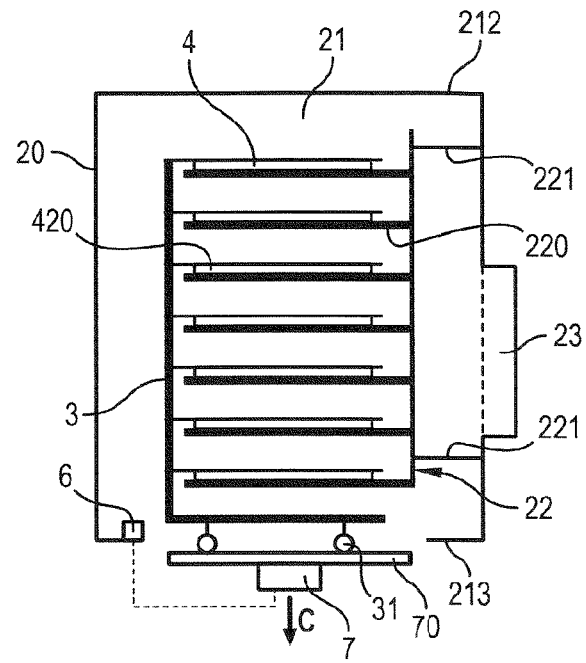

In the methods of application in FIGS. 4A and 4B, the cooking module 22 is fixed since it is mounted on a fixed chassis 221, attached to the oven walls and it is the carriage 3 and the soles 220 which are moved and more specifically lowered.

In this case, the bottom 213 of the oven has a platform 70 in its central part, which could be circular and connected to mechanical or motor mechanisms 7 such as jacks or levers. These mechanisms 7 allow the platform 70 to be lowered in the direction of arrow C in FIG. 4B, until the bottom 421 of the cells 420 makes contact with the soles 220, or inversely to raise the platform 70 (arrow D in FIG. 4A) until the bottom of the cells 420 are removed from the soles 220 and the carriage 3 can be removed.

Once again, the sensor 6 detecting the opening or closing of the door 20 can be connected to the mechanical or motor mechanisms 7 so as to control the movement of platform 70 in accordance with the position of the door 20.

According to one variant, the mechanisms to lower the nets (4) could be integrated in the carriage 3. In such case, the nets 4 would be mounted on a mobile support chassis able to slide vertically in relation to the structure of the carriage 3 carrying the wheels or other means of moving the carriage.

This displacement could be done using mechanical means, such as one or more notches attached to the mobile chassis able to go into orifices located at different heights on the fixed chassis constituting the structure of the carriage 3. A system of rods is also possible.

As such, the nets 4 would be brought into contact with the soles 220 and would deform to cook by conduction and inversely could be raised and removed from the soles for the insertion or removal of the carriage from the oven.

Figure 5A:
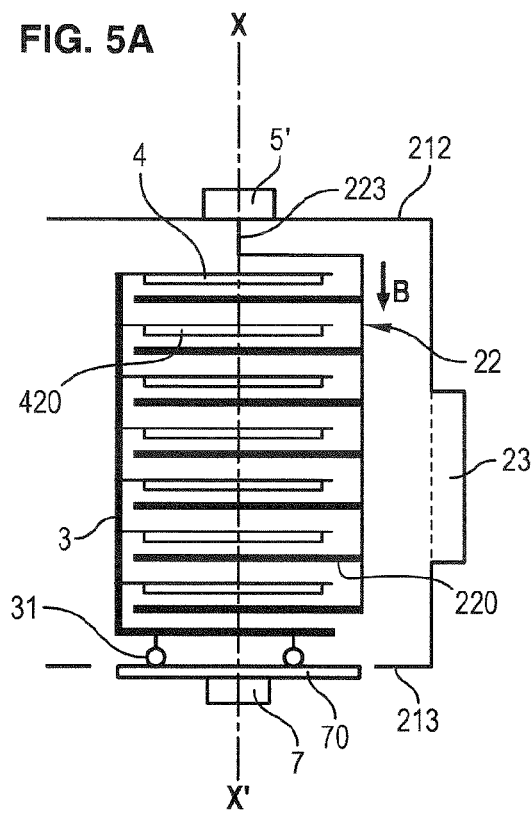
Figure 5B:
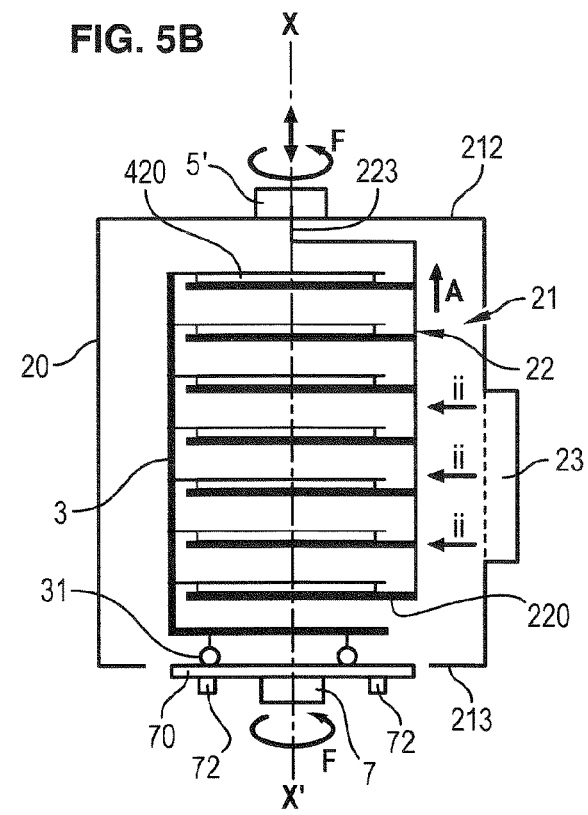

The method of application in FIGS. 5A and 5B also allows the carriage 3 and the cooking module 22 to be jointly turned around a vertical axis X-X' coaxial to the axis 223 (see arrows F in FIG. 5B).

In such case, the motor mechanisms 5' not only allow the axis 223 to slide vertically, but also to rotate.

Also, bearings 72 under the platform 70 are provided so that when the module 22 is caused to rotate, the carriage 3 is also rotated and the platform 70 turns due to the bearings 72.

The periphery of the platform 70 could, for example, have a series of cogs which mesh with a cogwheel on the output shaft of a motor.

The platform 70 could also comprise a vertical central axis which is directly caused to rotate.

According to a variant of the above method of application, which is not depicted in the drawings, the platform 70 could be eliminated and the bottom 213 of the oven is then flat, as depicted in FIGS. 3A and 3B, which simplifies cleaning.

The cooking module 22 is slightly modified so as to comprise grippers of the carriage 3. Once the carriage 3 is inserted into the oven 2, and the nets 4 are above the soles 220, the cooking module 22 is moved upwards in the direction of arrow A in FIG. 5B. After having covered a certain vertical course, the soles 220 come into contact with the nets 4 which deform as explained above and in this position relative to the cooking module 22 and the carriage 3, the grippers of the module 22 then come into contact with the carriage 3.

The vertical upward displacement of the cooking module 22 is continued, and as a result of the triggering of these grippers, the carriage 3 is also raised and no longer rests on the bottom 213 of the oven.

The entire module 22/carriage 3 can then be rotated around the vertical X-X' axis as explained above.

The grippers allow the relative position of the soles 220 and the nets 4 to be fixed and to prevent them from deforming excessively or being flattened when the module 22 is raised.

At the end of the cooking process, the module 22 is lowered (arrow B) as explained above jointly with FIGS. 4A and 5B.

The hot air blown by the turbine 23 passes through the baking chamber (arrows ii) in order to heat the soles 22 which will cook the product by conduction and to complete the cooking process by ventilation/convection.

Moreover, and although this has not been depicted in the drawings, it is also possible to combine the different methods of application of FIGS. 3A to 5B so as to simultaneously move the carriage 3 and the cooking module 22 vertically and/or to cause them to rotate.

It is also possible to combine the different methods of application of the oven of FIGS. 3A to 5B with the carriage in two parts or the carriage with gripper arms described above.

In the first case, the carriage is inserted into the oven, and the part bearing the wheels is extracted, while the part bearing the soles remains inside the oven where the different displacement mechanisms relating to the soles and nets are activated in order to cook by conduction. After the cooking, the part of the carriage equipped with wheels is once again inserted in the oven, attached to the part bearing the nets 4 and the entire carriage is extracted from the oven.

In the second case, in a similar manner, only the nets 4 remain in the oven during baking. They could be placed on guide rails provided for in the oven and it is the soles 220 which are moved towards the nets 4 to bake by conduction. The rest of the carriage 3 is outside of the oven during baking. Inversely, at the end of the baking process, it is re-inserted into the oven so that the grippers can allow the extraction of the nets 4.

The cooking device in accordance with the invention comprises several advantages.

It allows baking by conduction (called "sole" baking), by way of direct contact of the sole 220 with the bottom of the cells of the net 4, while retaining the profitability and ease of use of a convection oven.

Also, the carriage 3 and the nets 4 can be used during the proofing of the dough. The dough pieces are retained laterally by the edges of the cells 420 and the flexible material 42 takes the shape of the dough pieces. The carriage 3 is then inserted directly into the oven. The baker no longer needs to transfer the dough pieces from a proofing carriage to a second carriage to transfer or put them into the oven as was the case with apparatus known from prior art.

Once placed in the oven, the material 42 deforms upon contact with the soles 220 (is flattened) and provides a larger contact and therefore baking surface between the dough piece and the sole, thus ensuring baking by conduction and allowing the bottom of the bread to have the aesthetic aspect of direct sole baking, as with the methods of prior art.

Finally, this apparatus can also be used to bake pastries, such as cookies or pie shells.

The invention claimed is:

1. A device for cooking of dough-based food products comprising:
    a convection oven and a carriage,
    the convection oven comprising a cabinet, a door, a baking chamber and a cooking module coupled to an inside of said baking chamber and capable of being rotated around a vertical axis inside said baking chamber, said cooking module comprising a plurality of baking soles, each baking sole of the plurality of baking soles is stacked and spaced apart in a superimposed manner above or below another baking sole of the plurality of baking soles within the baking chamber, and the convection oven further comprising a heater that heats said plurality of baking soles;
    said carriage comprising a plurality of nets, each net of the plurality of nets comprising a strip of deformable flexible material fixed onto a frame, said flexible material being heat-resistant and comprising at least one cell for said food products to be baked,
    wherein each net of the plurality of nets is stacked and spaced apart in a superimposed manner above or below another net of the plurality of nets, wherein the carriage is configured to allow insertion of said plurality of nets into the convection oven and removal of said plurality of nets from the convection oven, and wherein insertion of said carriage into said baking chamber causes each net of the plurality of nets to be placed in a superimposed manner above a respective baking sole of the plurality of baking soles of the cooking module coupled to the inside of the baking chamber,
    wherein said device further comprises mechanisms housed inside the convection oven that move said plurality of baking soles and said plurality of nets vertically relative to each other and that jointly rotate the carriage comprising the plurality of nets and the cooking module comprising the plurality of baking soles carrying the plurality of nets around the vertical axis,
    wherein said mechanisms further allow said plurality of baking soles and said plurality of nets to be brought into an active position and a passive position, wherein in said active position a bottom of said at least one cell of each net touches the respective baking sole above which each net is located and each net deforms upon contact with said respective baking sole so that said food products are baked by conduction, and wherein in said passive position the bottom of said at least one cell of each net is spaced away from the respective baking sole above which each net is positioned so that the said carriage comprising the plurality of nets can be inserted into or removed from said convection oven;
    wherein said device further comprises a control apparatus for controlling said mechanisms, wherein the control apparatus is actuated by the position of the door, wherein, when the door is closed, the control apparatus controls the mechanisms to cause each net to be placed in the active position, and wherein, when the door is open, the control apparatus controls the mechanisms to cause each net to be placed in the passive position;
    wherein said mechanisms are mechanisms for the displacement of the cooking module which allow the cooking module to be raised bringing the cooking module into the active position and lowered bringing the cooking module into the passive position;
    wherein raising the cooking module into the active position further causes one or more grippers of the cooking module to contact the carriage and vertically raise the carriage from a bottom of the oven.

2. The device according to claim 1, characterised in that said heater comprises an air propulsion turbine and a heat source.

3. The device according to claim 1, characterised in that said carriage comprises a chassis with pairs of sliders and the frame of each net is sized and arranged to be able to slide along said sliders and be supported by said sliders.

4. The device according to claim 1, characterised in that the flexible material of which each net is made is water and/or steam permeable.

5. The device according to claim 1, characterised in that said plurality of nets are made of woven fibreglass.

6. The device according to claim 1, characterised in that the plurality of nets are coated with a non-stick material.

7. The device according to claim 1, wherein the device further comprises a sensor detecting the position of the door, wherein the control apparatus is actuated by the sensor detecting the position of the door.

\* \* \* \* \*